Figure 1:
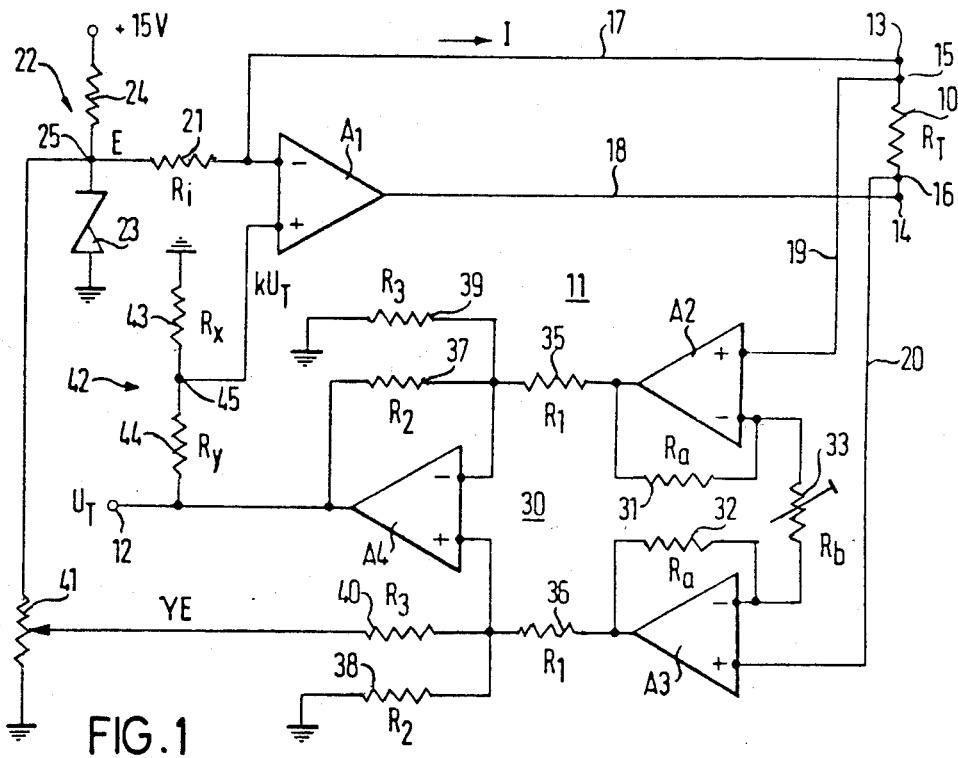

United States Patent [19]

Regtien

[11] Patent Number: 4,556,330
[45] Date of Patent: Dec. 3, 1985

[54] RESISTANCE THERMOMETER AND LINEARIZATION CIRCUITRY

[75] Inventor: Paulus P. L. Regtien, Delft, Netherlands

[73] Assignee: Endress U. Hauser GmbH u. Co., Maulburg, Fed. Rep. of Germany

[21] Appl. No.: 521,532

[22] Filed: Aug. 9, 1983

[30] Foreign Application Priority Data

Aug. 27, 1982 [DE] Fed. Rep. of Germany ....... 3231996

[51] Int. Cl.⁴ ............................................. G01K 7/18
[52] U.S. Cl. .................................... 374/185; 307/310
[58] Field of Search .............. 374/183, 170, 171, 172

[56] References Cited

U.S. PATENT DOCUMENTS

| | | | |
|---|---|---|---|
| 3,793,630 | 2/1974 | Meijer et al. | 374/171 X |
| 3,818,760 | 6/1974 | Howard et al. | 73/291 |
| 3,842,674 | 10/1974 | Wilbur et al. | 374/172 |
| 3,882,725 | 5/1975 | Rao et al. | 374/172 X |
| 4,109,196 | 8/1978 | Carmody | 324/123 C X |
| 4,169,243 | 9/1979 | Payne et al. | 374/172 |
| 4,198,676 | 4/1980 | Varnum et al. | 374/170 X |
| 4,209,774 | 6/1980 | Bendler | 374/170 X |
| 4,215,336 | 7/1980 | Smith | 374/185 X |
| 4,216,675 | 8/1980 | Nagata et al. | 324/65 R |
| 4,217,542 | 8/1980 | Abbe et al. | 324/65 R X |
| 4,363,556 | 12/1982 | Belliveau et al. | 374/185 X |
| 4,380,155 | 4/1983 | Paddock et al. | 374/170 X |

Primary Examiner—Daniel M. Yasich
Attorney, Agent, or Firm—Murray, Whisenhunt & Ferguson

[57] ABSTRACT

The resistance thermometer comprises a temperature dependent measuring resistor (10) and a measuring circuit (11) for measuring the voltage drop at the measuring resistor which is produced by a current (I) flowing across the measuring resistor (10). The measuring resistor (10) lies in the feedback circuit of an operational amplifier ($A_1$) whose inverting input is applied via a resistor (21) to a constant reference voltage (E). To linearize the characteristic of the measuring circuit a voltage ($k.U_T$) is applied to the non-inverting input of the operational amplifier ($A_1$), which voltage is in a predetermined ratio (k) to the output voltage ($U_T$) of the measuring circuit (11).

5 Claims, 3 Drawing Figures

RESISTANCE THERMOMETER AND LINEARIZATION CIRCUITRY

The invention relates to a resistance thermometer having a temperature dependent measuring resistor and a measurement circuit for measuring the voltage drop at the measuring resistor which is produced by a current flowing across the measuring resistor.

The measurement of the voltage drop at the measuring resistor may be carried out with a two-wire circuit or with a four-wire circuit. In the case of the two-wire circuit the measuring resistor is only connected with two conductors across which the current flows to the measuring resistor and back. The voltage drop is measured in the measuring circuit at the input of this double conductor so that the conductor resistances and possible transfer resistances at the connection points are included in the measurement. In the case of the four-wire circuit the voltage drop is detected directly at the measuring resistor and transferred via two additional conductors to the measuring circuit. The conductor resistances and transfer resistances of the current supply are not therefore included in the measurement.

Both measuring processes involve the problem that the temperature dependence of the measuring resistor is non-linear so that in the case of a constant measuring current the voltage drop at the measuring resistor is not proportional to the temperature. If the measurement circuit is to provide an output voltage which is proportional to the temperature, special measures designed to linearize the characteristic of the measuring circuit must be carried out. It becomes more difficult to solve this problem if a zero point compensation and a sensitivity adjustment are additionally provided. The circuit costs provided for the linearization of known resistance thermometers are therefore considerable.

The object of the invention is to provide a resistance thermometer in which very good linearization in a large temperature range may be achieved with low circuit costs both with a two-wire circuit and a four-wire circuit.

In accordance with the invention, this object is solved in that the measuring resistor lies in the feedback circuit of an operational amplifier, whose inverting input is applied across a resistor to a constant reference voltage, and in that a voltage is applied to the non-inverting input of the operational amplifier which voltage is in a predetermined ratio to the output voltage of the measuring circuit.

In the case of the resistance thermometer of the invention the linearization takes place by positive feedback of a portion of the temperature dependent output voltage to the input of the operational amplifier supplying the measuring current so that the measuring current is modified as a function of the temperature. The portion to be fed back for the suppression of the non-linear term of the output voltage may be readily calculated in each case as a function of the characteristic quantities of the measurement resistor and the measurement circuit. The linearization obtained in this way remains within narrow tolerance limits in a large temperature range. It also enables a zero point compensation and a sensitivity adjustment with good resolution.

The circuit costs required are very low, as there is only a requirement for a circuit which supplies the feedback voltage in addition to the operational amplifier supplying the measuring current. This may be, in accordance with a preferred embodiment of the invention, a simple voltage divider to which the temperature dependent output voltage is applied and to whose tap the non-inverting input of the operational amplifier is connected. The voltage divider ratio required for the linearization may be readily calculated from the characteristic quantities of the measurement resistance and the measuring circuit.

Advantageous embodiments and further developments of the invention are set out in the subclaims.

Figure 2:
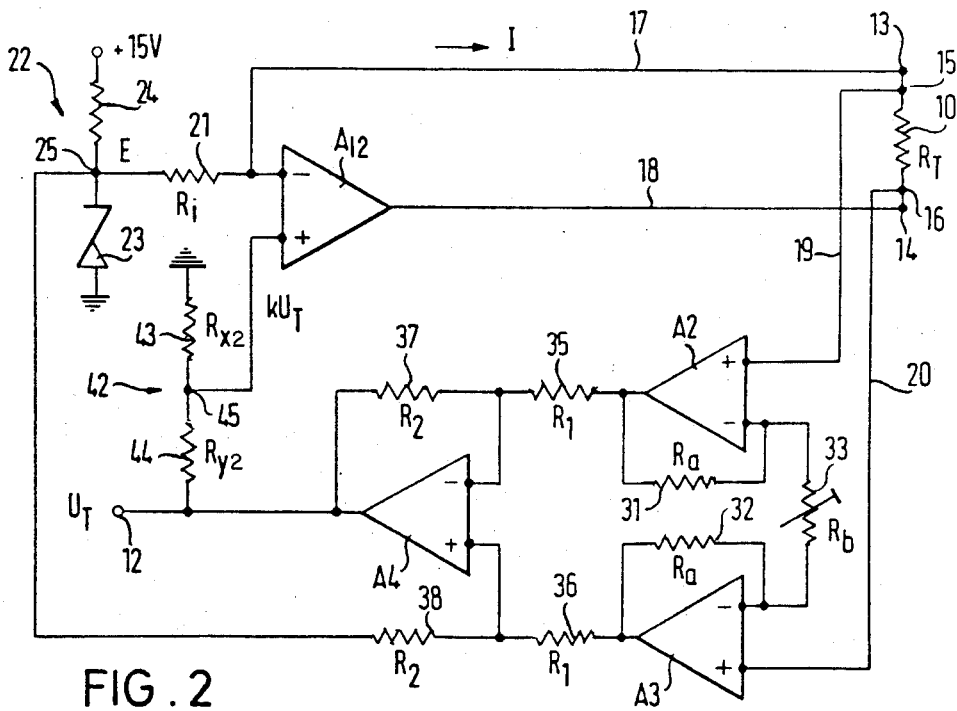
Figure 3:
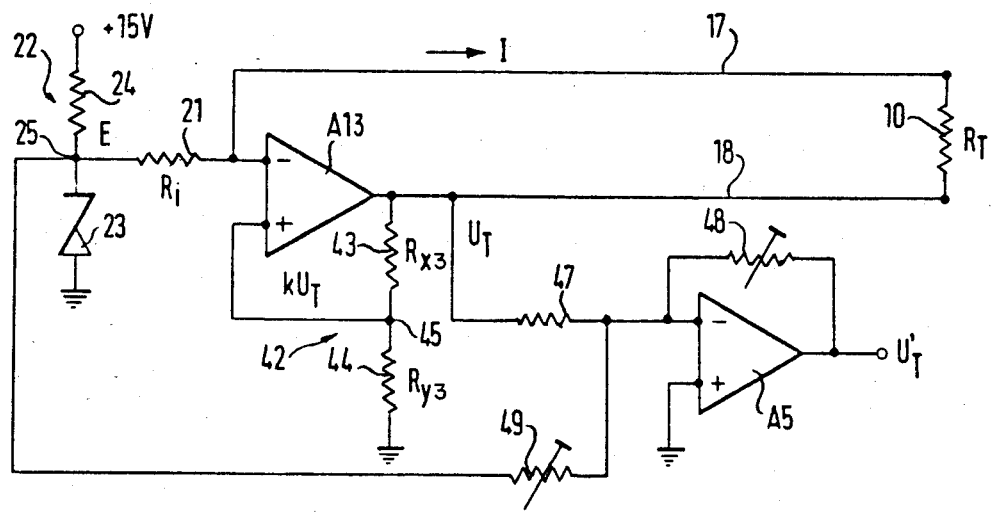

Further features and advantages of the invention are shown in the following description of embodiments with reference to the drawings, in which:

FIG. 1 is the circuit diagram of a resistance thermometer of the invention, in which the measurement is carried out using a four-wire circuit, FIG. 2 is the circuit diagram of a modified embodiment of the resistance thermometer of FIG. 1 and FIG. 3 is the circuit diagram of a resistance thermometer of the invention in which the measurement is carried out using a two-wire circuit.

The resistance thermometer shown in FIG. 1 comprises a measurement resistor 10 with the temperature dependent resistance $R_T$ and a measurement circuit 11 which supplies a voltage $U_T$ at the output 12, which voltage is proportional to the temperature of the measurement resistor 10.

The measuring resistor is for example a platinum resistor of the Pt 100 type with the standardized resistance of 100 $\Omega$ at 0° C., which may be formed as a wire-wound resistor or preferably formed on a substrate using thin film techniques.

The measurement circuit 11 is formed such that it enables the measurement of the voltage drop at the measurement resistor 10 in the case of a four-wire circuit. The measurement resistor is provided for this purpose with two current terminals 13, 14 and with two voltage terminals 15, 16. Two conductors 17, 18 are connected to the current terminals 13, 14, via which said conductors a current I is supplied through the measurement resistor. Two further conductors 19, 20 are connected to the voltage terminals 15, 16, via which said two further conductors the voltage drop at the measuring resistor 10 caused by the current I is detected. This four-wire measurement provides the known advantage that the resistances of the current conductors 17, 18 and the transfer resistances at the current terminals 13, 14 are not included in the voltage measurement.

The measurement resistor 10 lies across the conductors 17, 18 in the feedback circuit between the output and the inverting input of a first operational amplifier A1. The inverting input of the operational amplifier A1 is connected via an input resistor 21 with a reference voltage source 22 which supplies a constant reference voltage E. The input resistor 21 has the resistance $R_i$. The reference voltage source 22 consists in the embodiment illustrated of a Zener diode 23 which is applied in series with a resistor 24 to the supply voltage of, for example, +15 V. The reference voltage E determined by the Zener diode 23 appears at the circuit point 25 between the Zener diode and the resistor 24.

The voltage terminals 15, 16 of the measuring resistor 10 are connected via the conductors 19, 20 with the two inputs of a differential amplifier arrangement 30 which comprises three further operational amplifiers A2, A3 and A4. The non-inverting input of the second operational amplifier A2 is connected via the conductor 19 with the voltage terminal 15, and the non-inverting input of the third operational amplifier A3 is connected via the conductor 20 with the voltage terminal 16. The feedback resistors 31, 32 of the two operational amplifiers A2, A3 have the same resistance $R_a$. The inverting inputs of the two operational amplifiers A2, A3 are connected together via an adjustable compensating resistor 33 of the resistance $R_b$.

The outputs of the two operational resistors A2 and A3 are connected via amplifiers 35, 36, which have the same resistance $R_1$, with the two inputs of the fourth operational amplifier A4. The feedback resistor 37 of the operational amplifier A4 has the resistance $R_2$. A resistor 38 with the same resistance $R_2$ is connected between the non-inverting input and earth. A resistor 39 with a resistance $R_3$ is provided between the inverting input and earth. A resistor 40 having the same resistance $R_3$ connects the non-inverting input with the tap of a potentiometer 41 which is connected between the circuit point 25 and earth and therefore lies on the reference voltage E. The potentiometer 41 has a voltage divider ratio such that there is the voltage $\gamma E$ at its tap.

The output of the fourth operational amplifier A4 forms the output 12 of the measurement circuit 11 at which the temperature measurement voltage $U_T$ is available. A voltage divider 42 comprising two resistors 43 and 44 is connected to the output 12. The resistor 43 has the resistance $R_x$, and the resistor 44 has the resistance $R_y$. The tap 45 of the voltage divider 42 is connected with the non-inverting input of the first operational amplifier A1. The voltage divider 42 has the voltage divider ratio k, such that the voltage $kU_T$ is present at the non-inverting input of the operational amplifier A1.

The differential amplifier arrangement 30 formed from the three operational amplifiers A2, A3, A4 has a high input resistance and has the advantage that the amplification adjustment, i.e. the setting of the measuring sensitivity, may be carried out very simply using a single resistor, i.e. the adjustable resistor 33.

The voltage $\gamma E$ detected at the potentiometer 41 is superimposed via the operational amplifier A4 on the output voltage $U_T$ for the purposes of zero point compensation.

The output voltage portion $kU_T$ returned via the voltage divider 42 to the first operational amplifier A1 acts on the current I which is supplied via the measurement resistor 10. As is shown below for various cases, by suitable dimensioning of the voltage divider 42 taking into account the remaining characteristic quantities of the measurement circuit it is possible to achieve a linearization of the measurement circuit over a wide temperature range, such that the output voltage $U_T$ is proportional to the temperature of the measurement resistor 10, although as is known the resistance $R_T$ of the measurement resistor 10 is modified in a non-linear manner as a function of temperature T in accordance with the following relationship:

$$R_T = R_O(1 + \alpha T + \beta T^2). \tag{1}$$

wherein $R_O$ is the measurement resistance for the temperature T=0° C.

The following relationships apply with respect to the measurement circuit of FIG. 1:

$$U_T = -A I R_T + \frac{R_2}{R_3} \gamma E \tag{2}$$

with $A = \frac{R_2}{R_1}\left(1 + \frac{2R_a}{R_b}\right)$ (amplification factor of the differential amplifier arrangement 30)

$$I = \frac{E - kU_T}{R_i} \text{ (measurement current).} \tag{3}$$

On the basis of the above equations (1) to (3), the output voltage $U_T$ may be expressed as a function of the temperature T as follows:

$$U_T = U_O + ST(1 + NT) \tag{4}$$

wherein:

$$U_O = \frac{\frac{R_2}{R_3}\gamma E - A\frac{R_O}{R_i}E}{1 - kA\frac{R_O}{R_i}} \tag{4a}$$

(output voltage $U_T$ for $T = O$ or $R_T = R_O$)

$$S = \frac{-A\frac{R_O}{R_i}E\alpha}{1 - kA\frac{R_O}{R_i}} \text{ (sensitivity)} \tag{4b}$$

$$N \approx \frac{\beta}{\alpha} + \frac{kA\frac{R_O}{R_i}\alpha}{1 - kA\frac{R_O}{R_i}} \tag{4c}$$

Under the condition N=O, $U_T$ is proportional to T. For this purpose the following must apply in accordance with equation (4c):

$$kA\frac{R_O}{R_i} = \frac{-\beta}{\alpha^2 - \beta} \tag{5}$$

In this case in accordance with equation (4b):

$$S = \frac{\beta E}{\alpha k} \tag{6}$$

The value of k may therefore be calculated from the required sensitivity S.

Example:
$S = -50\ mVK^{-1}$ $\alpha = 3.9 \cdot 10^{-3} K^{-1}$ $\beta = -5.8 \cdot 10^{-7} K^{-2}$ $E = 6.2 V$ gives:

$k = 1.844 \cdot 10^{-2}$ $kA\frac{R_O}{R_i} = 0.0367$

On the basis of the calculated value of k it is possible to ascertain the resistance values $R_x$ and $R_y$ of the voltage divider 42.

The calculated value for $kA R_O/R_i$ provides the amplification factor A of the differential amplifier arrangement 30, which is to be adjusted by the resistor 33.

The following should apply for the zero point compensation:

$$U_O = 0.$$

From equation (4a) the following arises:

$$\frac{R_2}{R_3} \gamma = A \frac{R_O}{R_i} \quad (7)$$

The zero point compensation is therefore independent of the size of the reference voltage E.

If the measuring resistor 10 is short circuited ($R_T = 0$), in accordance with equation (2):

$$U_T(R_T = 0) = \frac{R_2}{R_3} \gamma E \quad (8)$$

A comparison of equations (4a) and (4b) shows that without the compensation voltage ($\gamma E = 0$) the output voltage $U_T$ in the case of T=0 has the following value:

$$U_O = \frac{S}{\alpha} \quad (9)$$

So that this voltage may be compensated to zero, the compensation voltage $\gamma E$ in accordance with equations (7) and (4b) must be adjusted such that the following applies:

$$\frac{R_2}{R_3} \gamma E = A \frac{R_O}{R_i} E = -\frac{S}{\alpha}\left(1 - kA\frac{R_O}{R_i}\right) \quad (10)$$

In accordance with equation (8) this value is identical to the output voltage $U_T$ in the case of a short-circuited measuring resistor 10 ($R_T = 0$). The adjustment of the compensation voltage $\gamma E$ may therefore be carried out at any temperature in that the measuring resistor 10 is short-circuited and the output voltage $U_T$ is set to the value calculated from equation (10) by adjustment of the potentiometer (41).

Example:

Using the previously determined numerical values, the following value is obtained from equation (10):

$$\frac{S}{\alpha}\left(1 - kA\frac{R_O}{R_i}\right) = -12.350 \text{ V}.$$

The output voltage $U_T$ in the case of a short-circuited measuring resistor 10 is set to this value by adjustment of the potentiometer 41. The sensitivity compensation takes place by means of the compensating resistor 33 in the case of a predetermined fixed value of the measuring resistor 10, for example in the case of $R_T = R_O = 100\Omega$.

The linearization obtained by means of the voltage divider 42 is not impaired by the superposition of the compensation voltage.

The high input resistances of the amplifiers A2 and A3 prevent a voltage drop at the voltage lines 19 and 20.

The differential amplifier arrangement therefore only measures the actual voltage drop at the measuring resistance 10, irrespective of the lengths of the conductors 19 and 20.

FIG. 2 shows a modified embodiment of the resistance thermometer. It differs from the embodiment of FIG. 1 in that the potentiometer 41 is omitted and the non-inverting input of the amplifier A4 is connected via the resistor 38 having a resistance $R_2$ directly to the circuit point 25 at which there is the reference voltage E. The two resistors 39, 40 having a resistance $R_3$ may therefore be omitted.

In this circuit, the equation for $U_T$:

$$U_T = U_O + ST(1 + NT) \quad (4)$$

includes the voltage $U_O$:

$$U_O = \frac{-A\frac{R_O}{R_i} E + E}{1 - kA\frac{R_O}{R_i}} \quad (4a')$$

whereas for S and N the same formulae (4b) and (4c) apply as in the case of the circuit of FIG. 1.

The values of k and $kA R_O/R_i$ may therefore be calculated in the same way as in the case of FIG. 1.

For the purposes of zero point compensation the output voltage $U_T$ in the case $R_T = R_O$ is set to $U_T = 0$ by means of the compensating resistor 33. The following then arises in accordance with formula (4a'):

$$A \cdot \frac{R_O}{R_i} = 1.$$

The zero point compensation is therefore again independent of the size of the reference voltage E.

The sensitivity S is then, in accordance with the formula (4b):

$$S = \frac{-E\alpha}{1 - k}.$$

As k is fixed by formula (5), the sensitivity is only dependent on the value of the reference voltage E.

Example:

$$E = 6.285 \text{ V}$$

$$k = k \cdot A \frac{R_O}{R_i} = 0.0367 \left( \text{as } A \frac{R_O}{R_i} = 1 \right)$$

gives $$S = -24.60 \text{ mV/K}.$$

If a specific sensitivity is required, this may be accurately obtained if the reference voltage E is not fixed, but adjustable. The reference voltage E is then set to the value $$E = -\frac{S}{\alpha}(1 - k)$$

when S is the required sensitivity. The zero point compensation again takes place in that the output voltage $U_T$ when $R_T = R_O$ is set to the value $U_T = O$ using the compensating resistor 33.

FIG. 3 shows a very simple embodiment of the resistance thermometer for two-wire measurements.

The measuring resistor 10 is again positioned in the feedback circuit of an operational amplifier A13, whose inverting input receives the reference voltage E via the input resistor 21. The non-inverting input is connected to the tap of the voltage divider 42 which is however now connected to the output of the operational amplifier A13.

The following applies for this circuit:

$$U_T = \frac{-E \frac{R_T}{R_i}}{1 - k - k \frac{R_T}{R_i}} \tag{11}$$

By inserting $$K = \frac{R_O}{R_i} \cdot \frac{1}{1 - k - k \frac{R_O}{R_i}}$$

equation (11) may be written as follows:

$$U_T = \frac{-EK(1 + \alpha T + \beta T^2)}{1 - kK\alpha T - kK\beta T^2} = A + BT + CT^2 \tag{12}$$

For $C = O$ the output voltage $U_T$ is proportional to the temperature T. The condition $C = O$ is satisfied for:

$$kK\beta + kK\alpha^2 + \beta - k^2K^2\alpha^2 \approx O. \tag{13}$$

From this it is possible to calculate the numerical values for K and k taking into account the desired value of the current I.

Example:
For $I = 1 mA$ $E = 6.2 V$ $R_i = 6.2 k\Omega$ the following is obtained:

$kK = 4.14 \cdot 10^{-2}$ $k = 0.71$

A linearization of the measuring circuit may also take place in this case in that the current flowing across the measuring resistor 10 is influenced as a function of the temperature by positive feedback of a fixed fraction of the output voltage $U_T$.

The zero point compensation and the sensitivity compensation take place in the circuit of FIG. 3 by means of a further operational amplifier A5, whose inverting input is connected via a resistor 47 with the output of the amplifier A13, whilst the non-inverting input is earthed. The adjustable resistor 48 disposed in the feedback circuit of the operational amplifier A5 is designed for adjustment of the sensitivity. The zero point compensation is carried out by an adjustable resistor 49 which connects the reference voltage source 22 with the inverting input.

I claim:

1. A resistance thermometer comprising a first operational amplifier having an inverting input, a non-inverting input and an output; a temperature-dependent measuring resistor having two current supply terminals and two voltage pick-up terminals separate from said current supply terminals, said temperature-dependent measuring resistor connected by said current supply terminals in a feedback loop from said output of said first operational amplifier to said inverting input of said first operational amplifier; means for applying a constant reference voltage via a resistor to said inverting input of said first operational amplifier; a differential amplifier having two inputs and an output; means for connecting said two inputs of said differential amplifier with said two voltage pick-up terminals, respectively; a voltage divider, having a tap, connected to said output of said differential amplifier, said voltage divider having a predetermined voltage divider ratio; and means for connecting said tap of said voltage divider with said non-inverting input of said first operational amplifier.

2. The resistance thermometer as claimed in claim 1, wherein said differential amplifier comprises a second operational amplifier having an inverting input, a non-inverting input and an output, said non-inverting input of said second operational amplifier defining one of said two inputs of said differential amplifier; a third operational amplifier having an inverting input, a non-inverting input and an output, said non-inverting input of said third operational amplifier defining the other of said two inputs of said differential amplifier; an adjustable resistor interconnecting said inverting inputs of said second and third operational amplifiers; and a fourth operational amplifier having a non-inverting input, an inverting input and an output, said inverting input and said non-inverting input connected to said outputs of said second and third operational amplifiers, respectively, via resistors of the same resistance value; said voltage divider being connected to the output of said fourth operational amplifier.

3. The resistance thermometer as claimed in claim 2, wherein a voltage derived from said constant reference voltage is applied to the non-inverting input of said fourth operational amplifier for zero point compensation.

4. The resistance thermometer as claimed in claim 3, wherein said non-inverting input of said fourth operational amplifier is connected via a resistor with the tap of a potentiometer to which said constant reference voltage is connected.

5. The resistance thermometer as claimed in claim 3, wherein said non-inverting input of said fourth operational amplifier is connected via a resistor to said constant reference voltage source.

* * * * *